Dec. 13, 1960 J. W. HARRISON ET AL 2,963,838
FILM SEALING MECHANISM FOR PACKAGING MACHINES
Filed June 5, 1958 3 Sheets-Sheet 1

Inventors
John W. Harrison
Joe N. Welch
By Robert S. Topazer
Atty.

Dec. 13, 1960 J. W. HARRISON ET AL 2,963,838
FILM SEALING MECHANISM FOR PACKAGING MACHINES
Filed June 5, 1958 3 Sheets-Sheet 2
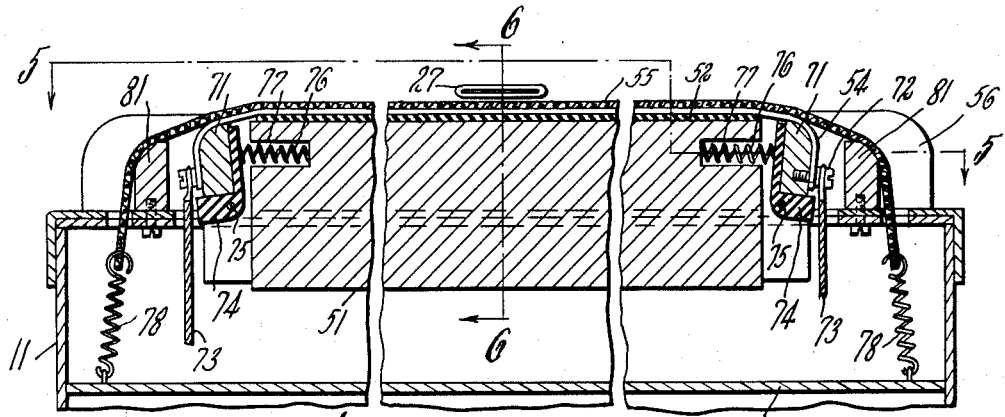
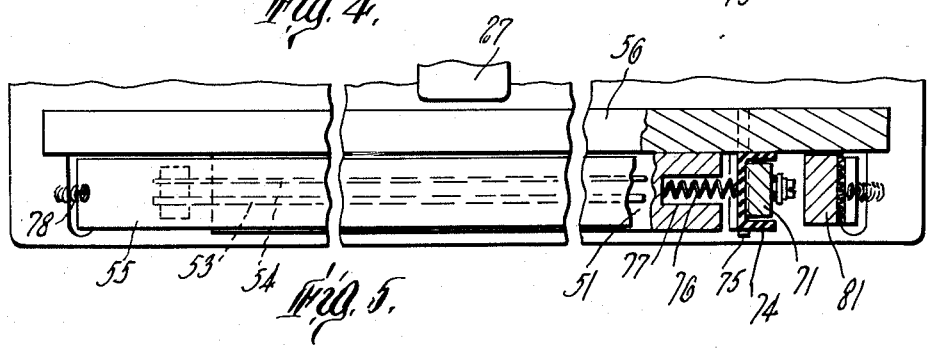
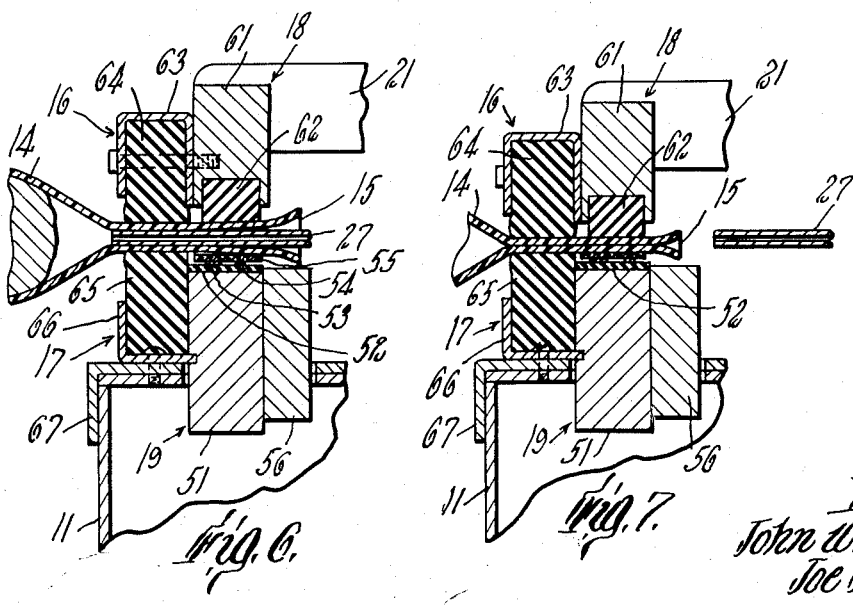
Inventors
John W. Harrison
Joe N. Welch
by
Robert S. Topezer Atty.

Dec. 13, 1960   J. W. HARRISON ET AL   2,963,838
FILM SEALING MECHANISM FOR PACKAGING MACHINES
Filed June 5, 1958   3 Sheets-Sheet 3

Inventors
John W. Harrison
Joe N. Welch
by Robert S. Topazes Atty.

United States Patent Office 2,963,838
Patented Dec. 13, 1960

2,963,838

FILM SEALING MECHANISM FOR PACKAGING MACHINES

John W. Harrison, Winchester, and Joe N. Welch, Walpole, Mass., assignors to W. R. Grace & Co., Cambridge, Mass., a corporation of Connecticut Filed June 5, 1958, Ser. No. 740,044

6 Claims. (Cl. 53—79)

This invention relates to vacuumizing and heat sealing machines for thermoplastic envelopes, and in particular it is concerned with the arrangement and construction of the sealing bars employed in machines of this kind.

It is an object of the invention to provide an improved sealing bar arrangement in a vacuumizing and sealing machine for thermoplastic envelopes whereby neater and more attractive packages can be made.

It is another object to provide in a machine of the above-mentioned character a sealing bar assembly which is adapted to act both as a sealing device and an improved means to facilitate the removal of excess film.

It is a further object of the invention to provide a machine of the above-mentioned character that is adapted to operate reliably and has a relatively long operating life.

It is a still further object of the invention to provide a machine of the above-mentioned character that is not unduly complicated and expensive to manufacture.

The novel features of the invention together with further objects and advantages thereof will become apparent from the following description of a preferred embodiment of the invention illustrated in the accompanying drawings.

In the drawings:

Fig. 4 is a sectional view taken on line 4—4 of Fig. 2;

Fig. 5 is a sectional view taken on line 5—5 of Fig. 4;

Figs. 6 and 7 are sectional views taken on lines 6—6 of Fig. 4;

Figure 8:
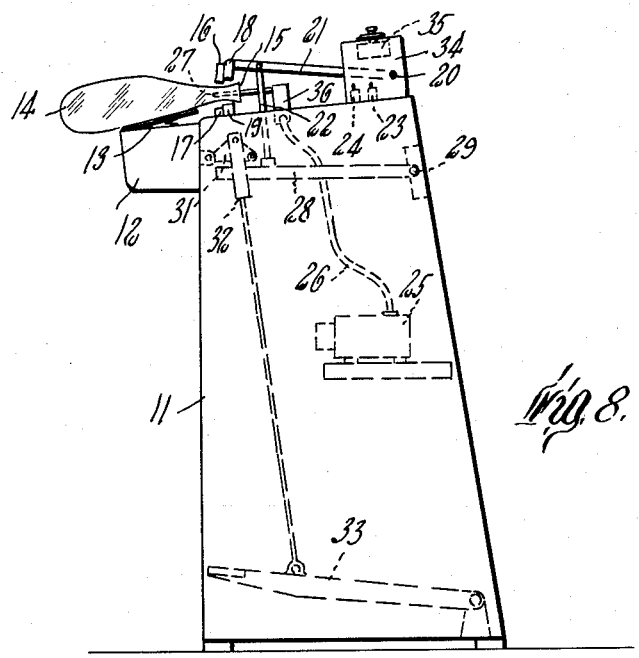
Fig. 8 is a view in elevation of the entire machine on a reduced scale.

With reference first to Fig. 8 it will be observed that the machine comprises generally a supporting structure including a side panel 11 to support the manually operable parts of the machine at a convenient working height. At the front of the machine, that is, towards the left of Fig. 8 is a projecting shelf 12. A depressible plate 13 overlying the middle of the shelf 12 serves to support packaged products while the packages are being vacuumized and sealed. Such a package is the pouch 14 whose open end or mouth 15 is inserted between a pair of gripper bars 16 and 17 and a pair of sealing bars 18 and 19. The upper gripper bar 16 and sealing bar 18 are rigidly fastened to a pivotal arm 21 pivoted at 20, and fastened to the arm is a pull rod 22 to produce pivotal movement thereof. Depending upon the extent of this pivotal movement, first a microswitch 23 and then a microswitch 24 are actuated thereby. Microswitch 24 controls the energization of the heater elements (not shown in Fig. 8) in the sealing bars, and switch 23 controls the operation of a vacuum pump unit 25. Vacuum pump 25 is connected through a flexible hose 26 to a nozzle 27 which is movable between a position spaced from the pouch 14 and a position where it is adapted to communicate with the interior of the pouch as shown. To move the nozzle there is provided a depresser bar 28 pivoted at 29 to which the pull rod 22 is connected. A cam 31 which acts on the bar 28 is connected through a crank arm linkage 32 to a foot pedal 33 and by means of the foot pedal the vacuumizing and sealing operations are successively initiated. There is also provided at the back end of the machine toward the right of Fig. 8 a raised panel 34 on which is mounted a timer 35. Timer 35 is connected in circuit with microswitch 24 to establish the duration of the interval during which the heater elements are energized.

Figure 1:
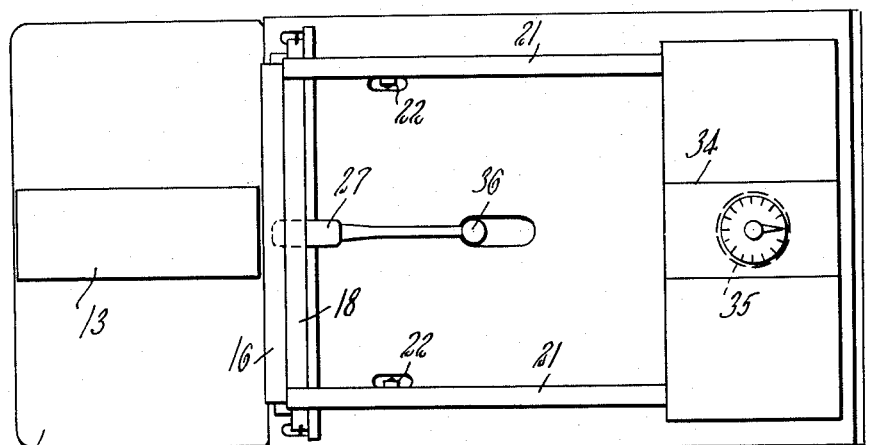
Fig. 1 is a plan view of the vacuumizing and heat sealing machine according to the invention.
Figure 2:
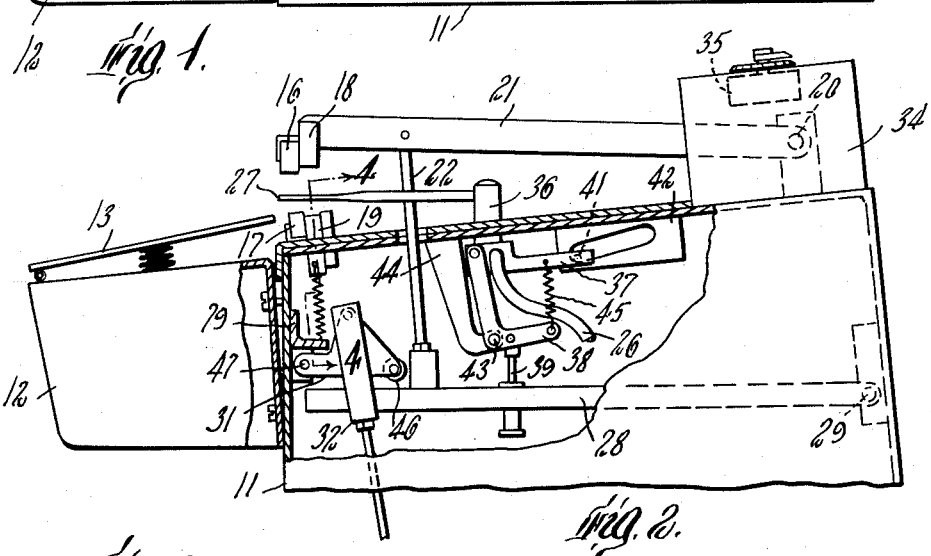
Fig. 2 is a view in elevation of the machine with certain parts broken away to show more clearly the mechanical linkages which actuate the sealing bar and vacuum nozzle of the machine.

With reference now to Figs. 1 and 2, and especially Fig. 2, the nozzle 27 is seen to project from a supporting post 36 to which is rigidly fastened a guide member 37. A bell crank 38 acts on the guide member, the bell crank being actuated by a pull rod 39 connected to the depresser bar 28. Guide member 37 mounts a roller 41 which rides in a slot formed in a fixed member 42 that defines the path of movement of the nozzle 27. Bell crank 38 is pivotally connected at 43 to a fixed support arm 44 and by means of a tension spring 45 connected between the guide member 37 and the bell crank 38, the latter is biased in a counterclockwise direction as shown in Fig. 2. In this way, nozzle 27 is caused to assume normally the position shown wherein it is adapted to communicate with the interior of a pouch. The more detained showing of Fig. 2 also indicates that the active surface of the cam 31 presented to the bar 28 takes the form of a roller 46 remote from the fixed pivot point 47 of the cam.

Turning now to Figs. 6 and 7 where the sealing bar assembly is shown more in detail, the lower sealing bar 19 is seen to comprise a base member or bar 51 preferably of metal, and an overlying layer of insulating material 52, such as silicone plastic filled with fiberglass. The latter supports a pair of heater elements 53 and 54 in spaced relation to the base 51, and over the heater elements there extends a layer of insulating tape 55. Base 51 is rigidly fastened to a cross support member 56 which is fixed. The upper sealing bar 18 comprises a backing bar 61, preferably of metal, which is adapted to retain a resilient bar 62 of relatively hard rubber, the latter providing the surface that cooperates with the lower sealing bar. Fastened to the front of the bar 61 is a channel 63 and retained in the channel member 63 is a bar 64 of relatively soft rubber, such as foam rubber. Channel member 63 and bar 64 comprise the upper gripper bar 16. The lower gripper bar 17 is formed with a bar 65, preferably of like resilient nature, which is held in position by an angle member 66 such that the rear surface of the bar 65 abuts the base 51 of the lower sealing bar. Angle member 66 is screwed to a section of the frame 67 and also its horizontal leg is fitted into a slot in the base 51.

Figure 3:
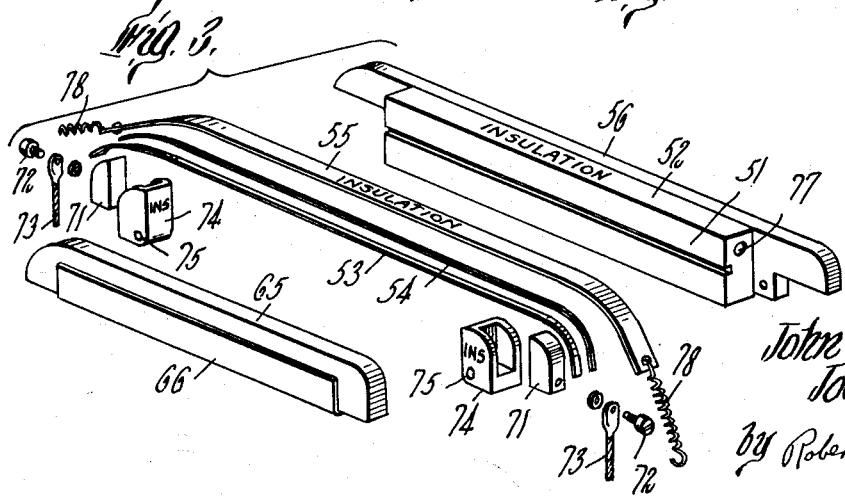
Fig. 3 is an exploded view of the lower sealing bar assembly.

The lower sealing bar may be seen more in detail in Figs. 3, 4, and 5. As best shown in Fig. 4, the heater elements are at either end clamped against a block 71 of conductive material by a terminal screw 72, and a lead wire 73 provides the electrical connection to the terminal screw. Block 71, in turn, is fastened to an L-shaped insulator 74 which is pivoted at 75. A compression spring 76 retained in a bore 77 formed in the base member urges the insulator 74 away from the base. In this way, the heater elements are placed under a desired amount of tension. The tape 55 that covers the heater elements is held in tension by a tension spring 78 fastened to each end thereof and anchored to a frame member 79. The tape is passed around upstanding spacer blocks 81 having rounded surfaces in contact with the tape which prevents interference with the connections to the heater elements. Also sharp bends in the tape that might cause it to break are thereby avoided.

The heater elements themselves comprise parallel and adjacent ribbons of suitable resistance material such as Nichrome, the forwardmost element 53 being substantially wider than the element 54. However, element 54 is thicker than element 53 and has the same cross-sectional area thereas. Since the length of the wires are substantially the same, it follows that their resistances are likewise equal to one another.

Figure 9:
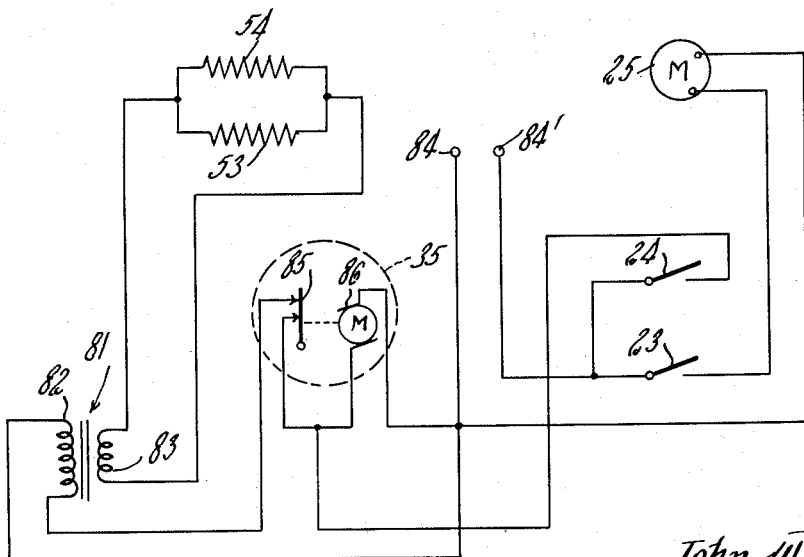
Fig. 9 is a schematic diagram of the electrical circuit incorporated in the machine.

As shown in Fig. 9, the electrical circuit to energize the heater elements and the vacuum pump motor includes in addition to the timer 35 and the microswitches 23 and 24 a current transformer 81 having a primary winding 82 and a secondary winding 83. The primary winding 82 has one of its ends connected directly to one of the terminals 84 of a convenient source of A.C. current, such as for example a 115-volt outlet. The other source terminal 84' and the other end of the primary winding are interconnected through the timer switch 85, and the timer motor 86 is energized through the microswitch 24. The heater elements 53 and 54 are connected in parallel to the secondary winding 83 and the vacuum pump motor 25 is connected to the source terminals through microswitch 23. To simplify the drawing and make it easier to understand, no relay devices have been shown. Those skilled in the art will appreciate, however, that the energization of the transformer primary and the pump motor can be relay controlled, with the switches 23 and 24 arranged to actuate the relays. Such an arrangement will normally be preferable because of the relatively heavy currents drawn by the heater elements and the pump motor.

In operation the positions of the various parts of the machine will be as shown in Fig. 2 preparatory to a vacuumizing and sealing operation. To effect these operations, pedal 33 is pressed part way down causing the arm 21 to pivot downwardly and the upper gripper bar to clamp the film against the lower gripper bar and around the nozzle. This closes off the body of the package so that air may be withdrawn through the nozzle by the pump. The pump is started by virture of the aforementioned travel of the arm 21 which is adapted to actuate the microswitch 23. At this point, the positions of the parts of the sealing bar assembly are as shown in Fig. 6.

When the envelope has been evacuated sufficiently, as determined by visual inspection of the tightness of the envelope around the product, pedal 33 is depressed to the limit. As a result, the nozzle is caused to move rearwardly out of engagement with the film, and the arm 21 is caused to move downwardly until the upper sealing bar is disposed in clamping relation to the lower sealing bar with the film in between. This additional movement of the arm 21 actuates the microswitch 24 which energizes the heater elements and starts the timer motor. After a predetermined interval established by the setting of the timer dial, timer switch 85 is opened by the timer motor thereby de-energizing the heater elements. The positions of the various parts of the sealing bar assembly are now as shown in Fig. 7.

Finally, when the foot pedal is released, the upper gripper and sealing bars are raised out of the way by the arm 21 and the nozzle is returned to its forward position where it is adapted to receive the mouth of another package or envelope. Also, with the arm 21 in its raised position, the plungers of the microswitches are released, opening the switches and de-energizing the pump motor and the timer motor. The timer will then proceed to reset itself by conventional means, not shown.

By virtue of the dual heater element arrangement, there will have been formed two seals at the mouth of the package. Because the ribbon 54 is narrower and thicker than ribbon 53 (each having the same electrical resistance), there is less heat carried away by the bag material in the region of ribbon 54 and hence the ribbon 54 is hotter than ribbon 53 and affects more melt of the bag material than ribbon 53. Furthermore, as ribbon 54 is thicker than ribbon 53, more pressure is exerted by the upper bar 62 on the package material overlying the ribbon 54 than on the package material overlying ribbon 53. Hence the material at the seal made by ribbon 54 is weaker than any other portion of the package, thus facilitating tearing off the excess material extending beyond the seal line made by ribbon 54. Conversely, the wider seal, nearer to the body of the package, insures that the package will be air-tight. With this arrangement, the mouth of the package will not be drawn in and wrinkled to any substantial extent since during the vacuumizing process it is left open to the atmosphere. Because the seal is made very close to the line of closure of the envelope by the gripper bars, however, the amount of air permitted to remain in the package for this reason is unappreciable.

Although the invention has been described with reference to a single preferred embodiment, those skilled in the art will recognize that this embodiment is susceptible of various modifications that are within the spirit and scope of the invention. Therefore, the invention should be deemed to be limited not by the details of what has been shown and described but rather by the scope of the appended claims only.

What is claimed is:

1. In a vacuumizing and heat sealing machine for envelopes formed with a thermoplastic film the combination including a nozzle communicable with the interior of the envelope, a pair of resilient gripper bars to clamp the film around the nozzle and close off the major portion of the envelope, means to withdraw air from the envelope through said nozzle, means to withdraw the nozzle from the envelope with said gripper bars in clamping position, and a pair of sealing bars disposed substantially parallel and adjacent to said gripper bars to produce a heat-seal with the film defining the remaining portion of the envelope, one of said heat sealing bars including a pair of ribbon-like electrically-energized heater elements extending longitudinally of the sealing bar in parallel spaced relation to one another, the heater element nearer to said gripper bars having an appreciably greater width and less thickness than the heater element more remote therefrom, whereby said more remote heater element extends above said nearer heater element to exert more pressure on the thermoplastic film as the film is pressed against the heater elements by the other of said sealing bars.

2. In a vacauumizing and heat sealing machine for envelopes formed with a thermoplastic film, the combination including a nozzle mounted for reciprocatory movement toward and away from a position wherein it is adapted to communicate with the interior of the envelope, a pair of resilient gripper bars disposed at right angles to the direction of movement of said nozzle on either side thereof, a first of said gripper bars being fixed, a pivotal arm mounting the second of said gripper bars, a foot pedal, a control mechanism interrelating the positions of said arm and said pedal and being adapted to move said second gripper bar into clamping relation with said first gripper bar when said pedal is depressed a predetermined amount, thereby to clamp the film around the nozzle and close off the major portion of the envelope, a vacuum pump operatively connected to said nozzle to withdraw air from the envelope, a lost motion linkage operatively connected between said pedal and said nozzle to withdraw the latter from the envelope when said pedal is depressed to the limit, and a pair of sealing bars disposed substantially parallel and adjacent to said gripper bars, a first of said sealing bars being fixed and including a pair of ribbon-like electrically-energized heater elements extending longitudinally of the sealing bar in parallel spaced relation to one another, the heater element nearer to said gripper bars having an appreciably greater width and less thickness than the heater element more remote therefrom, and the second of said sealing bars being mounted on said arm and being caused by said control mechanism to move into clamping relation with the first sealing bar when said nozzle is withdrawn whereby said more remote heater element extends above said nearer heater element to exert more pressure on the thermoplastic film as the film is pressed against the heater elements by said second sealing bar.

3. The combination according to claim 1 wherein the heater elements are so proportioned as to have equal resistances.

4. The combination according to claim 3 wherein one of the sealing bars includes a metal base, a rigid layer of insulating material overlying said base to support said heater elements in spaced relation to the base, and a strip of relatively thin insulating tape overlying said heater elements.

5. In a heat sealing machine for envelopes formed with a thermoplastic film, a sealing bar provided with inner and outer ribbon-like electrically-energized heater elements extending longitudinally of the bar in parallel spaced relation to one another, said inner heater element being substantially wider and thinner than the outer heater element and said elements being so proportioned in thickness as to have equal resistances, whereby said outer heater element extends above said inner heater element to engage the thermoplastic film with greater pressure and over a smaller area than does said inner heater element.

6. In a heat sealing machine for envelopes formed with a thermoplastic film, a pair of sealing bars to weld the film together, a first of said bars comprising a rigid backing and a layer of resilient material to press the film against the second of said bars, and the second of said bars comprising a metal base, a rigid layer of insulating material overlying the base, inner and outer ribbon-like electrically-energized heater elements extending longitudinally of said insulated layer in parallel spaced relationship to one another, said inner heater element being substantially wider and thinner than the outer heater element, said heater elements being so porportioned in thickness as to have equal resistance, and a strip of relatively thin, insulating tape overlying said heater elements, whereby said outer heater element extends above said inner heater element to engage the thermoplastic film with greater pressure and over a smaller area than said inner heater element.

References Cited in the file of this patent

UNITED STATES PATENTS

| | | |
|---|---|---|
| 2,281,187 | Waters | Apr. 28, 1942 |
| 2,559,368 | Pancratz | July 31, 1951 |
| 2,608,333 | Marziani | Aug. 26, 1952 |
| 2,651,444 | Casey et al. | Sept. 8, 1953 |
| 2,672,268 | Bower | Mar. 16, 1954 |
| 2,697,901 | Hosack | Dec. 28, 1954 |
| 2,749,686 | Lorenz et al. | June 12, 1956 |